J. CONLEY.
CAMP RANGE.
APPLICATION FILED NOV. 2, 1907.
905,502.
Patented Dec. 1, 1908.
2 SHEETS—SHEET 1.
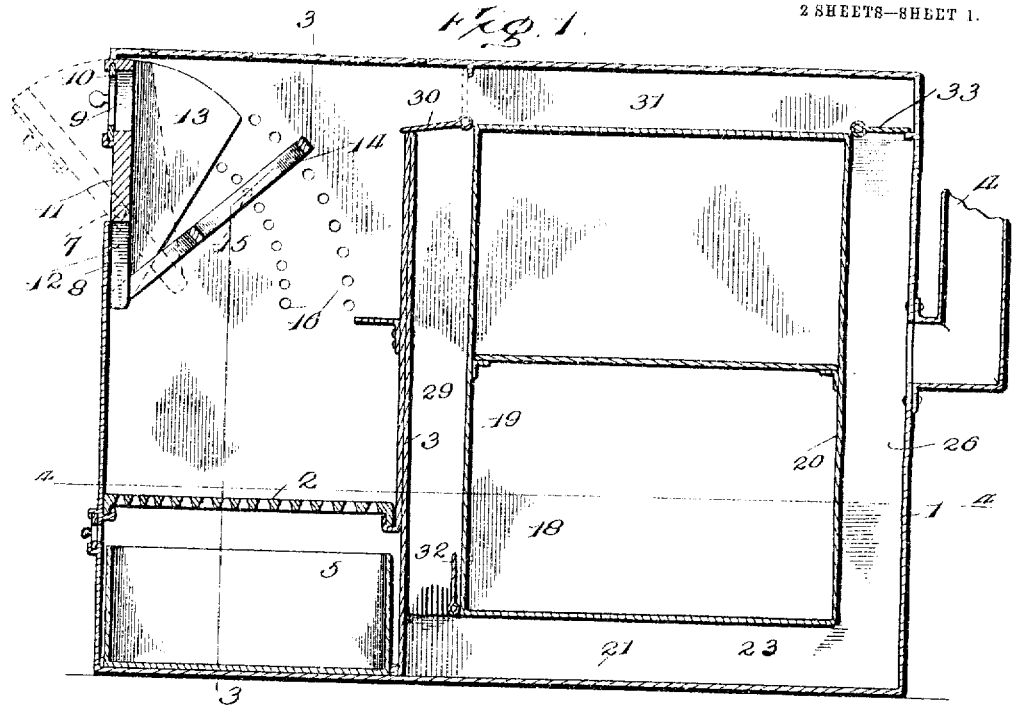
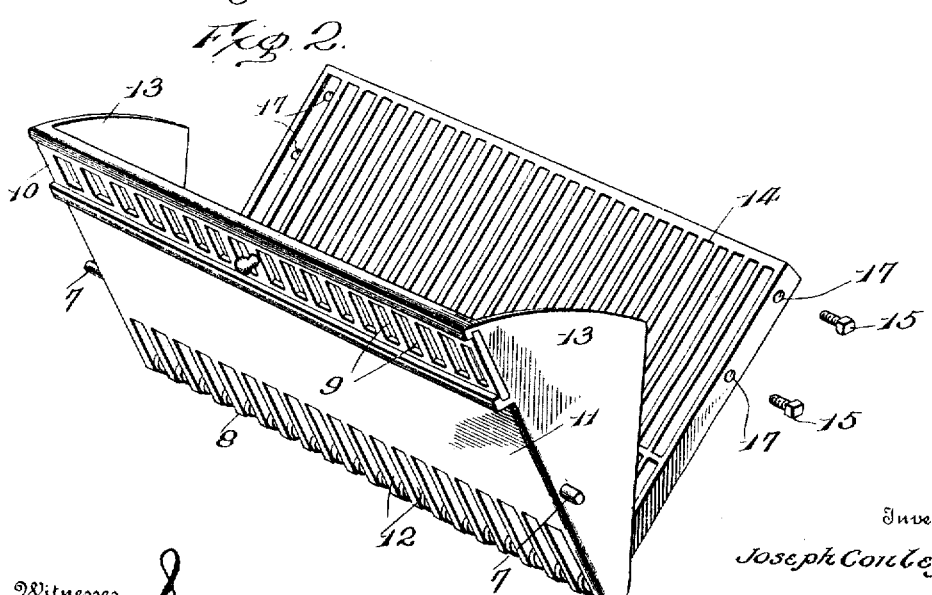
Inventor
Joseph Conley
Witnesses
K. E. Klein.
By Dudley, Brown & Phelps
Attorneys J. CONLEY.
CAMP RANGE.
APPLICATION FILED NOV. 2, 1907.
905,502.
Patented Dec. 1, 1908.
2 SHEETS—SHEET 2.
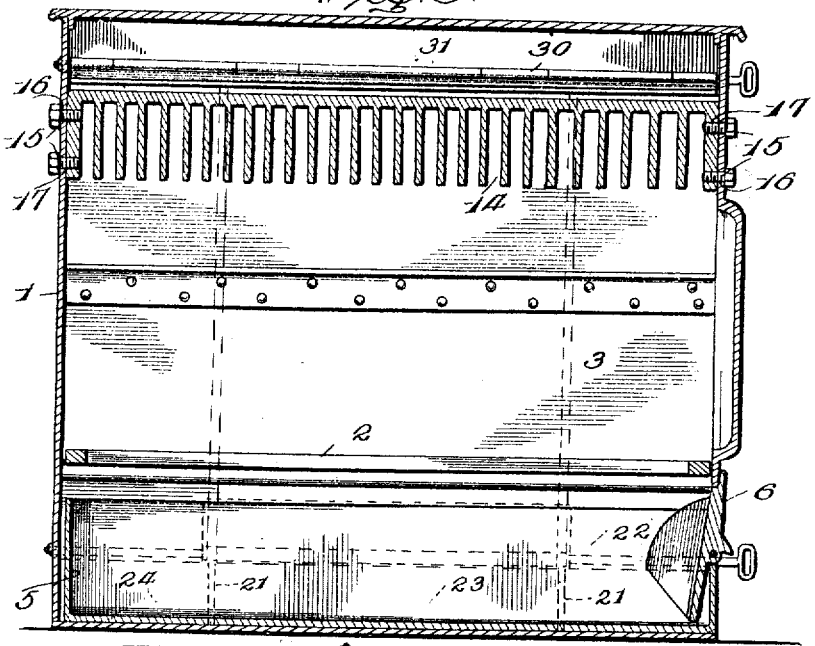
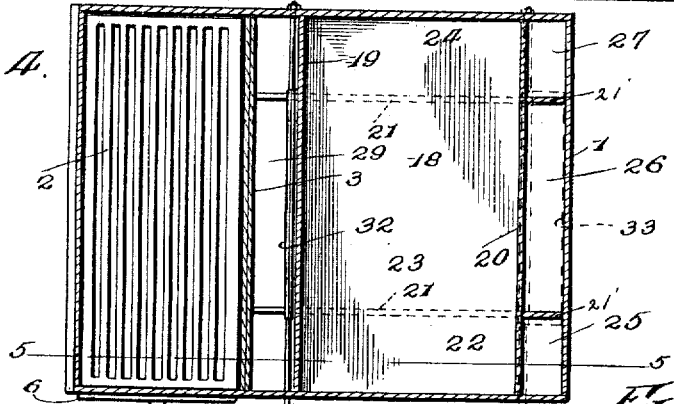
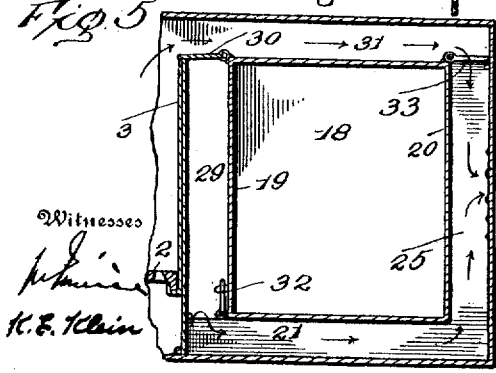
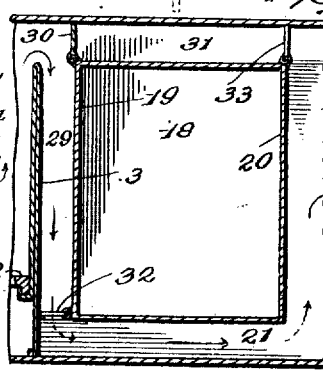
Witnesses
Inventor
Joseph Conley
Attorneys

UNITED STATES PATENT OFFICE.

JOSEPH CONLEY, OF ANADARKO, OKLAHOMA.

CAMP-RANGE.

No. 905,502.   Specification of Letters Patent.   Patented Dec. 1, 1908.

Application filed November 2, 1907. Serial No. 400,425.

*To all whom it may concern:*

Be it known that I, JOSEPH CONLEY, citizen of the United States, residing at Anadarko, in the county of Caddo, Oklahoma, have invented certain new and useful Improvements in Camp-Ranges, of which the following is a specification.

My invention relates to certain new and useful improvements in camp ranges and the object of my invention is to provide a construction of camp range which is adapted not only for cooking purposes but in which garbage and refuse may be readily incinerated.

With this and other objects in view my invention consists in certain constructions, combinations and arrangements of parts the preferred form of which will be first described in connection with the accompanying drawings and then the invention particularly pointed out in the appended claims.

Referring to the drawings wherein I show the preferred form of my invention and wherein the same part is designated by the same reference numeral wherever it occurs, Figure 1 is a central longitudinal section of a camp range embodying my invention; Fig. 2 is a detail perspective view of the garbage holding grate; Fig. 3 is a transverse section taken on line 3—3 of Fig. 1; Fig. 4 is a section taken on line 4—4 of Fig. 1; Fig. 5 is a section taken on line 5—5 of Fig. 4, and Fig. 6 is a view similar to Fig. 5 showing the dampers however in a different position.

1 designates a casing preferably having its sides rectangular in form. At one end I provide a grate 2 on which the fire is built. This grate is supported between one of the end walls of the casing and a partition 3 which extends from side to side of the casing but not to the top thereof, leaving between the top of the partition and the top of the casing a space for the passage of the products of combustion on their way to the stack 4.

5 is a pan located beneath the grate 2, and at one side of the pan the casing is provided with a pivoted section adapted when opened out to form a pouring plate whereby liquid may be readily poured into the pan. The pan is for the purpose of holding liquid which it is desired to evaporate. Pivoted in the side of the casing above the grate bars by means of the pivots 7 is a plate 8 having its upper edge provided with openings 9 controlled by a sliding damper 10. The central portion 11 of the plate is solid and at the lower edge the slots 12 are formed. At the side edges of the plate are secured the sector shaped plates 13 for the purpose of closing the sides when the plate is in its outer position shown in dotted lines in Fig. 1.

14 is a grate section mounted in the sides of the casing by means of the pins 15 passing through holes 16 in the sides of the casing and engaging holes 17 in the sides of the grate. By this means the angle of the grate can be adjusted as desired. The lower edge of the grate 14 and the lower edge of the plate 8 are adapted to interlock as is best shown in Figs. 1 and 2, whereby a container is formed for the reception of garbage, or other material to be incinerated. It will be noted that the material is supported immediately over the fire and by the construction of the parts 8 and 14 the heat and flames have free access to the material. The plate 8 is moved into the position shown in dotted lines in Fig. 1, to fill the hopper and then the plate is moved to the position, shown in full lines in this figure, while the incinerating operation is progressing.

18 designates the oven which is supported between the partition 3 and the stack 4. The oven is supported so that there is a space all the way around the same to form flues, as will be described.

19 is a plate on the end of the oven adjacent to the partition 3 and is of the same size as the partition.

20 is a plate of the same size as the plate 19, but secured to the end of the oven adjacent to the stack 4.

21—21 are a pair of partitions extending from the lower side edges of the bottom of the oven to the bottom of the casing and from the partition 3 to the end of the casing. These plates therefore divide the space between the bottom of the oven and the bottom of the casing into three flues 22, 23 and 24. The space between the end plate 20 and the oven is also divided into three flues 25, 26 27 by the plates 21′ which extend up from the end of the plates 21 to the top of the oven. The flue 25 connects with the flue 22, the flue 26, with the flue 23 and the flue 27 with the flue 24. At the other end they all connect with the one flue 29 between the partition 3 and the oven.

30 is a damper extending the full width of the casing and adapted when turned down to close the entrance of the flue 29 as shown in Fig. 5 and when up, as in Fig. 6, to close the entrance into the space 31, which is the space between the top of the oven and the casing.

32 is a damper adapted to control the entrance to the flue 23 from the flue 29 and 33 is a damper adapted to control the entrance to the flue 26 from the flue 31.

In the operation of these devices which are for the purpose of supplying the heat in different ways to the oven, when the dampers are in the position shown in Fig. 5, that is with the damper 30 closing the entrance to the flue 29 and the damper 33 closing the entrance to the flue 26 from the flue 31, but the damper 32 of the flue 23 open, then the products of combustion pass over the top of the oven, down the flues 25 and 27 into the flues 22 and 24, then, as the damper 32 is open, into the flue 23 and from there to the flue 26 and out the stack 4. When however the dampers are arranged as shown in Fig. 6 in which the damper 30 closes the entrance to the flue 31 and the damper 32 is closed while the damper 33 is open, then the products of combustion pass down the flue 29, into the flues 22 and 24, then into the flues 25 and 27 and into the flue 31, and from there to the flue 26 and stack 4. From this it will be seen that the products of combustion are caused to circulate thoroughly around the oven and that by the manipulation of the dampers the products of combustion may be caused to pass first in contact with either the top or the bottom of the oven and consequently the heat will be greatest in either the top or bottom as may be desired.

While I have described what I believe to be the preferred form of my invention I desire to have it understood that many changes may be made in the form, construction and arrangement of parts without departing from the spirit of my invention.

What I claim and desire to secure by Letters Patent is

1. The combination with a casing, of a grate mounted in the lower portion of the casing, a grate adjustably supported in the upper portion of the casing, a plate pivoted in the side of the casing and adapted to form with the last mentioned grate a receptacle adapted to contain material to be incinerated, said last mentioned grate carrying intermediate its ends a pair of pins and a pair of pins mounted at the end of said grate opposite that which is adjacent to the plate, and the sides of the casing being provided with openings with which said pairs of pins are adapted to engage, whereby the capacity of the receptacle can be varied and the contents dumped therefrom.

2. The combination with a casing, of a grate mounted in the lower portion of the casing, a grate adjustably mounted in the upper portion of the casing, a plate pivoted in the casing and having slots cut in its lower edge said slots being adapted to coöperate with the grate bars of the last mentioned grate, whereby a receptacle adapted to contain material to be incinerated is provided, said pivoted portion being constructed so that when in one position the receptacle may be readily filled and when in its other position to close the opening formed in the casing for its reception.

3. In a camp range, the combination with a casing having a combustion chamber, of an oven supported within said chamber, partitions dividing the space between the oven and the casing, and forming three flues beneath the oven, three flues at the back, one flue at the front and one flue at the top thereof, a damper for controlling the passage of the products of combustion either to the top flue or the front flue, a damper controlling the passage from the front flue to the middle flue at the bottom, and dampers controlling the passage from the top flue to the two outside flues at the front of the oven, whereby the products of combustion may be caused to take different paths around the oven.

In testimony whereof I affix my signature in presence of two witnesses.

JOSEPH CONLEY.

Witnesses:
FRANCIS M. PHELPS,
K. E. KLEIN.